United States Patent
Fok et al.

(10) Patent No.: US 12,352,557 B2
(45) Date of Patent: Jul. 8, 2025

(54) ORTHODONTIC ALIGNER WITH STRAIN MEASUREMENT FEATURES, AND METHODS OF MAKING AND USING THE SAME

(71) Applicant: REGENTS OF THE UNIVERSITY OF MINNESOTA, Minneapolis, MN (US)

(72) Inventors: Alex Fok, Minneapolis, MN (US); Brian Holmes, Minneapolis, MN (US); Ning Ye, Minneapolis, MN (US); Susan Mantell, Minneapolis, MN (US); Brent E. Larson, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 380 days.

(21) Appl. No.: 17/801,674

(22) PCT Filed: Feb. 24, 2021

(86) PCT No.: PCT/US2021/019465
§ 371 (c)(1),
(2) Date: Aug. 23, 2022

(87) PCT Pub. No.: WO2021/173710
PCT Pub. Date: Sep. 2, 2021

(65) Prior Publication Data
US 2023/0131264 A1  Apr. 27, 2023

Related U.S. Application Data

(60) Provisional application No. 63/016,041, filed on Apr. 27, 2020, provisional application No. 62/980,908, filed on Feb. 24, 2020.

(51) Int. Cl.
*G01B 11/16* (2006.01)
*G01L 1/24* (2006.01)
(Continued)

(52) U.S. Cl.
CPC ............... *G01B 11/16* (2013.01); *G01L 1/24* (2013.01); *G06T 7/0016* (2013.01); *G06T 7/32* (2017.01); *G06T 2207/30036* (2013.01)

(58) Field of Classification Search
CPC .......... G01B 11/16; A61C 7/08; A61C 7/002; G01L 1/24; G06T 7/0016; G06T 7/32; G06T 2207/30036; G06T 7/254
See application file for complete search history.

(56) References Cited

U.S. PATENT DOCUMENTS 4,184,175 A   1/1980  Mullane, Jr.
5,692,895 A  12/1997  Farzin-Nia et al.
(Continued)

FOREIGN PATENT DOCUMENTS

DE  4034007 A1  4/1992
EP  2581062 A2  4/2013
(Continued)

OTHER PUBLICATIONS

A Scheme of Deformation Measurement for Cancellous Bones Based on the Digital Image Correlation Method (Year: 2015).*
(Continued)

*Primary Examiner* — Nizar N Sivji
(74) *Attorney, Agent, or Firm* — QUARLES & BRADY, LLP

(57) ABSTRACT

Systems and methods for measuring changes in mechanical properties, mechanical responses, and or mechanical performances of orthodontic aligners are disclosed. The orthodontic aligners can include a plurality of speckles. The plurality of speckles are adapted for digital image correlation mea-
(Continued)

surements. The methods involve acquiring digital images of the orthodontic aligner and performing digital image correlation on these images. From the digital image correlation, a change in one or more mechanical properties, mechanical responses, and/or mechanical performances in the orthodontic aligner are determined. The systems and methods can provide insight into mechanical properties of physiological structures, which can aid patient diagnosis and treatment.

20 Claims, 11 Drawing Sheets

(51) Int. Cl.
 G06T 7/00 (2017.01)
 G06T 7/32 (2017.01)

(56) References Cited

U.S. PATENT DOCUMENTS

| | | | |
|---|---|---|---|
| 6,327,030 | B1 | 12/2001 | Ifju et al. |
| 6,471,511 | B1 | 10/2002 | Chishti et al. |
| 6,702,575 | B2 | 3/2004 | Hilliard |
| 8,535,580 | B2 | 9/2013 | Puttler et al. |
| 8,600,147 | B2 | 12/2013 | Iliopoulos et al. |
| 9,204,952 | B2 | 12/2015 | Lampalzer |
| 2006/0292517 | A1 | 12/2006 | Smith |
| 2007/0134613 | A1* | 6/2007 | Kuo ............ G06T 19/00 433/24 |
| 2014/0379356 | A1* | 12/2014 | Sachdeva ........... A61C 7/002 705/2 |
| 2015/0276397 | A1 | 10/2015 | Michaelis et al. |
| 2016/0154926 | A1* | 6/2016 | Szigeti ............. G06T 7/80 703/8 |
| 2016/0228216 | A1* | 8/2016 | Anderson ........... A61C 7/002 |
| 2018/0353263 | A1* | 12/2018 | Salah ............... G06T 7/0012 |
| 2019/0015177 | A1* | 1/2019 | Elazar .............. A61C 9/0046 |
| 2019/0102880 | A1* | 4/2019 | Parpara ............. B29C 51/46 |
| 2019/0125493 | A1 | 5/2019 | Salah et al. |
| 2019/0247164 | A1 | 8/2019 | Verker et al. |
| 2020/0100866 | A1* | 4/2020 | Medvinskaya ....... B33Y 80/00 |
| 2020/0205937 | A1* | 7/2020 | Mah ................. A61C 9/0053 |
| 2020/0402222 | A1* | 12/2020 | Shah ................ G06T 7/12 |
| 2021/0174604 | A1* | 6/2021 | Long ................ G06T 19/20 |
| 2022/0207737 | A1* | 6/2022 | Parpara ............. G06T 7/521 |
| 2024/0115137 | A1* | 4/2024 | Van Der Poel ...... A61B 5/1032 |

FOREIGN PATENT DOCUMENTS

| | | |
|---|---|---|
| EP | 2754407 A1 | 7/2014 |
| EP | 3569167 A2 | 11/2019 |

OTHER PUBLICATIONS

Comparison of the Stress Strain Capacity between Different Clear Aligners (Year: 2019).*
Digitalization in Restorative Dentistry (Year: 2019).*
Measurement of thickness and profile of a transparent material using fluorescent stereo microscopy (Year: 2016).*
Barbagallo et al., A novel pressure film approach for determining the force imparted by clear removable thermoplastic appliances, Annals of Biomedical Engineering, 2008, 36(2):335-341.
Barone et al., Computation Design and Engineering of Polymeric Orthodontic Aligners, International Journal for Numerical Methods in Biomedical Engineering, 2017, 33(8):e2839, 25 pages.
Berfield et al., Fluorescent Image Correlation for Nanoscale Deformation Measurements, Small, 2006, 2(5):631-635.
Burden, Oral health-related benefits of orthodontic treatment, Seminars in Orthodontics, 2007, 13(2):76-80.
BYTE®, The Better and Faster (At-Home) Invisible Teeth Aligners, Retrieved from https://www.byte.com/, Copyright 2023 Byte, 11 pages.
Candid, Candid Clear Aligners, A Straighter, Brighter Smile, Guaranteed, Retrieved from https://www.candidco.com/, Copyright 2023 Candid Care Co., 7 pages.
Chakrapani et al., Periotest values: Its reproducibility, accuracy, and variability with hormonal influence, Contemporary Clinical Dentistry, 2015, 6(1):12-15.
Charalampakis et al., Accuracy of clear aligners: A retrospective study of patients who needed refinement, American Journal of Orthodontics and Dentofacial Orthopedics, 2018, 154(1):47-54.
Ciavarella et al., Comparison of the Stress Strain Capacity Between Different Clear Aligners, The Open Dentistry Journal, 2019, 13(1):41-47.
ClearCorrect: A Straumann Group Brand, ClearCorrect: Your Partner in Ortho, Retrieved from https://www.straumann.com/clearcorrect/en/doctors.html, Copyright 2023 Institut Straumann AG, 6 pages.
Cluydts et al., Realisation of Micro-Speckle Patterns for Digital Image Correlation on Dental Implants, Sustainable Construction and Design (SCAD-2012), 2012, 3(1):1-7.
Comba et al., A Three-Dimensional Finite Element Analysis of Upper-Canine Distalization with Clear Aligners, Composite Attachments, and Class II Elastics, Journal Clinical Orthodontics, 2017, 51(1):24-28.
Cortona et al., Clear Aligner Orthodontic Therapy of Rotated Mandibular Round-Shaped Teeth: A Finite Element Study, The Angle Orthodontist, 2020, 90(2):247-254.
Dentsply Sirona, Essix ACE® Plastic, Directions for Use, 2019, 6 pages.
digitalimagecorrelation.org, A Practical Guide to DIC, Retrieved from https://digitalimagecorrelation.org/, Accessed on Nov. 2, 2023, 21 pages.
Djeu et al., Outcome assessment of Invisalign and traditional orthodontic treatment compared with the American Board of Orthodontics objective grading system, American Journal of Orthodontics and Dentofacial Orthopedics, 2005, 128(3):292-298.
Dong et al., A Review of Speckle Pattern Fabrication and Assessment for Digital Image Correlation, Experimental Mechanics, 2017, 57:1161-1181.
Doomen et al., Possibilities and limitations of treatment with clear aligners, An orientation, Nederlands tijdschrift voor tandheelkunde, 2018, 125(10):533-540 [No English Language Translation Available].
Drake et al., Orthodontic tooth movement with clear aligners, International Scholarly Research Notices, 2012, 2012:657973, pp. 1-7.
Elkholy et al., Forces and moments applied during derotation of a maxillary central incisor with thinner aligners: an in-vitro study, American Journal of Orthodontics and Dentofacial Orthopedics, 2017, 151(2):407-415.
Field et al., Mechanical Responses to Orthodontic Loading: A 3-Dimensional Finite Element Multi-Tooth Model, American Journal of Orthodontics and Dentofacial Orthopedics, 2009, 135(2):174-181.
Fujiwara et al., Mechanical evaluation of newly developed mouthpiece using polyethylene terephthalate glycol for transoral robotic surgery, Journal of Robotic Surgery, 2015, 9:347-354.
Galan-Lopez et al., A systematic review of the accuracy and efficiency of dental movements with Invisalign®, The Korean Journal of Orthodontics, 2019, 49(3):140-149.
Giancotti et al., Extraction treatment using Invisalign technique, Progress in Orthodontics, 2006, 7(1):32-43.
Gomez et al., Initial Force Systems during Bodily Tooth Movement with Plastic Aligners and Composite Attachments: A Three-Dimensional Finite Element Analysis, The Angle Orthodontist, 2015, 85(3):454-460.
Grauer et al., Computer-aided design/computer-aided manufacturing technology in customized orthodontic appliances, Journal of Esthetic and Restorative Dentistry, 2012, 24(1):3-9.
Grünheid et al., How accurate is Invisalign in nonextraction cases? Are predicted tooth positions achieved?, The Angle Orthodontist, 2017, 87(6):809-815.
Hong et al., Efficient design of a clear aligner attachment to induce bodily tooth movement in orthodontic treatment using finite element analysis, Materials, 2021, 14(17):4926, pp. 1-11.

(56) References Cited

OTHER PUBLICATIONS

Hu et al., Fluorescent Stereo Microscopy for 3D Surface Profilometry and Deformation Mapping, Optics Expression, 2013, 21(10):11808-11818.
Hu et al., Measurement of Thickness and Profile of a Transparent Material using Fluorescent Stereo Microscopy, Optics Expression, 2016, 24(26):29822-29829.
Hu et al., Fluorescent Digital Image Correlation Techniques in Experimental Mechanics, Science China Technological Sciences, 2018, 61:21-36.
Hunt et al., Professional perceptions of the benefits of orthodontic treatment, The European Journal of Orthodontics, 2001, 23(3):315-323.
INVISALIGN®, Invisalign Treatment, Invisalign Clear Aligners, Retrieved from https://www.invisalign.com/, Copyright 2023 Invisalign.com, 15 pages.
Ke et al., A comparison of treatment effectiveness between clear aligner and fixed appliance therapies, BMC Oral Health, 2019, 19(24):1-10.
Kravitz et al., How Well Does Invisalign Work? A Prospective Clinical Study Evaluating the Efficacy of Tooth Movement with Invisalign, American Journal of Orthodontics and Dentofacial Orthopedics, 2009, 135(1):27-35.
Kuo et al., Automated custom-manufacturing technology in orthodontics, American Journal of Orthodontics and Dentofacial Orthopedics, 2003, 123(5):578-581.
Lagravere et al., The Treatment Effects of Invisalign Orthodontic Aligners: A Systemic Review, The Journal of the American Dental Association, 2005, 136(12):1724-1729.
Li et al., Shrinkage of Dental Composite in Simulated Cavity Measured with Digital Image Correlation, JoVE (Journal of Visualized Experiments), 2014, 89:e51191, pp. 1-9.
Lombardo et al., Predictability of orthodontic movement with orthodontic aligners: a retrospective study, Progress in Orthodontics, 2017, 18(35):1-12.
Lukas et al., Periotest—a dynamic procedure for the diagnosis of the human periodontium, Clinical Physics and Physiological Measurement, 1990, 11(1):65-75.
Mccormick et al., Digital image correlation, Materials Today, 2010, 13(12):52-54.
Melenka et al., Three-Dimensional Deformation of Orthodontic Brackets, Journal of Dental Biomechanics, 2013, 4:1758736013492529, pp. 1-15.
Miller et al., Validation of Align Technology's Treat III™ digital model superimposition tool and its case application, Orthodontics & Craniofacial Research, 2003, 6:143-149.
Miller et al., A comparison of treatment impacts between Invisalign aligner and fixed appliance therapy during the first week of treatment, American Journal of Orthodontics and Dentofacial Orthopedics, 2007, 131(3):302-e1-302-e9.
Morita et al., Visualizing Displacement and Deformation Behavior of the Periodontium under Dental Occlusion Using a Digital Image Correlation Method, Journal of Biomechanical Science and Engineering, 2007, 2(3):105-114.
Muhleman, Periodontometry, A method for measuring tooth mobility, Oral Surgery, Oral Medicine, Oral Pathology, and Oral Radiology, 1951, 4:1220-1233.
Nedwed et al., Motivation, Acceptance, and Problems of Invisalign® Patients, Journal of Orofacial Orthopedics, 2005, 66(2):162-173.
Ødegaard et al., An evaluation of the torsional moments developed in orthodontic applications, An in vitro study, American Journal of Orthodontics and Dentofacial Orthopedics, 1994, 105(4):392-400.
Ojima et al., A perspective in accelerated orthodontics with aligner treatment, Seminars in Orthodontics, 2017, 23(1):76-82.
Papadimitriou et al., Clinical effectiveness of Invisalign® orthodontic treatment: a systematic review, Progress in Orthodontics, 2018, 19(37):1-24.
Parfitt, Measurement of the physiological mobility of individual teeth in an axial direction, Journal of Dental Research, 1960, 39(3):608-618.
Pavoni et al., Self-ligating versus Invisalign: analysis of dento-alveolar effects, Annali di Stomatologia, 2011, 2(1-2):23-27.
Proffit et al., Prevalence of malocclusion and orthodontic treatment need in the United States: estimates from the NHANES III survey, The International Journal of Adult Orthodontics and Orthognathic Surgery, 1998, 13(2):97-106.
Putrino et al., Clear aligners: Between evolution and efficiency—A scoping review, International Journal of Environmental Research and Public Health, 2021, 18(6):2870, pp. 1-19.
Ren et al., Optimum force magnitude for orthodontic tooth movement: a mathematic model, American Journal of Orthodontics and Dentofacial Orthopedics, 2004, 125(1):71-77.
Robertson et al., Effectiveness of clear aligner therapy for orthodontic treatment: A systematic review, Orthodontics & Craniofacial Research, 2020, 23(2):133-142.
Rossini et al., Efficacy of Clear Aligners in Controlling Orthodontic Tooth Movement: A Systematic Review, The Angle Orthodontist, 2015, 85(5):881-889.
Samuel et al., High Resolution Deformation and Damage Detection using Fluorescent Dyes, Journal of Micromechanics and Microengineering, 2007, 17(11):2324-2327.
Schmidt et al., Effect of variable periodontal ligament thickness and its non-linear material properties on the location of a tooth's centre of resistance, Journal of Biomechanics, 2019, 94:211-218.
Seo et al., Comparative analysis of stress in the periodontal ligament and center of rotation in the tooth after orthodontic treatment depending on clear aligner thickness—finite element analysis study, Materials, 2021, 14(2):324, pp. 1-17.
Shoe Orthodontics, 3M Clarity Trays: Invisible Aligners, Retrieved from https://www.shoeorthodontics.com/clear-aligners/3m-clarity-trays/, Accessed on Nov. 2, 2023, 5 pages.
Simon et al., Forces and moments generated by removable thermoplastic aligners: incisor torque, premolar derotation, and molar distalization, American Journal of Orthodontics and Dentofacial Orthopedics, 2014, 145(6):728-736.
Simon et al., Treatment outcome and efficacy of an aligner technique—regarding incisor torque, premolar derotation and molar distalization, BMC Oral Health, 2014, 14(68):1-7.
Smilelove, Smilelove Clear Aligners, Retrieved from https://smilelove.com/, Copyright 2023 Smilelove, 4 pages.
SNAPCORRECT™, Truly Invisible Aligners, Retrieved from https://snapcorrect.com/, Copyright 2023 SnapDent., 5 pages.
Su et al., Modeling viscoelastic behavior of periodontal ligament with nonlinear finite element analysis, Journal of Dental Sciences, 2013, 8(2):121-128.
Vardimon et al., In-vivo von Mises strains during Invisalign treatment, American Journal of Orthodontics and Dentofacial Orthopedics, 2010, 138(4):399-409.
White et al., Discomfort associated with Invisalign and traditional brackets: A randomized, prospective trial, The Angle Orthodontist, 2017, 87(6):801-808.
Zhao et al., Maxillary expansion efficiency with clear aligner and its possible influencing factors, Chinese Journal of Stomatology, 2017, 52(9):543-548.
PCT International Search Report and Written Opinion, PCT/US2021/019465, May 13, 2021, 9 pages.

\* cited by examiner

ORTHODONTIC ALIGNER WITH STRAIN MEASUREMENT FEATURES, AND METHODS OF MAKING AND USING THE SAME

CROSS-REFERENCE TO RELATED APPLICATIONS

This application is a United States national stage filing under 35 U.S.C. 371 of International Patent Application No. PCT/US2021/019465, filed Feb. 24, 2021, which is related to, claims priority to, and incorporates herein by reference for all purposes U.S. Provisional Patent Application Nos. 62/980,908, filed Feb. 24, 2020, and 63/016,041, filed Apr. 27, 2020.

STATEMENT REGARDING FEDERALLY SPONSORED RESEARCH

N/A

BACKGROUND

Clear thermoplastic teeth aligners with incremental misfits are increasingly used to produce controlled tooth movement in orthodontics. However, there remains a need for ways to measure strain distributions within these teeth aligners in order to understand the forces at play with a user's teeth and the forces at play within the aligner itself. Improved understanding and control of the forces delivered to teeth can improve the efficiency of tooth movement and potentially lead to improved orthodontic outcomes.

SUMMARY OF THE DISCLOSURE

The present disclosure addresses the aforementioned drawbacks by providing orthodontic aligners with strain measurement features, and methods of making and using the same.

In one aspect, the present disclosure provides a method. The method includes: a) acquiring a first digital image of an orthodontic aligner comprising a plurality of speckles adapted for digital image correlation measurements; b) after a period of time following the acquiring of step a), acquiring a second digital image of the orthodontic aligner; c) performing digital image correlation on the first digital image and the second digital image; and) determining a change in one or more mechanical properties, mechanical responses, and/or mechanical performances in the orthodontic aligner based on the digital image correlation of step c).

In another aspect, the present disclosure provides an orthodontic aligner. The orthodontic aligner includes a plurality of speckles. The plurality of speckles are adapted for digital image correlation measurements.

BRIEF DESCRIPTION OF THE DRAWINGS

The drawings described herein are for illustration purposes only and are not intended to limit the scope of the disclosed embodiments in any way. The drawings described herein are for illustrative purposes only of selected embodiments and not all possible implementations, and are not intended to limit the scope of any of the various embodiments. It is understood that the drawings are not drawn to scale.

DETAILED DESCRIPTION

Before the present invention is described in further detail, it is to be understood that the invention is not limited to the particular embodiments described. It is also understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

Specific structures, devices and methods relating to measuring strain in orthodontic aligners are disclosed. It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

In an aspect, the present disclosure provides an orthodontic aligner. Features of the inventive orthodontic aligner are described herein and can be applicable to a wide variety of implementations of orthodontic aligners. The inventive concepts described herein are applicable to any orthodontic aligner that undergoes strain.

One particular orthodontic aligner is a clear orthodontic aligner. Typically, these aligners are polymeric in nature, though other materials can be utilized. Examples of suitable orthodontic aligners include, but are not limited to, those described in U.S. Pat. Nos. 6,702,575 and 6,471,511 and European Patents or Patent Applications Publication Nos. EP2581062, EP27754407, EP2211753, and EP3569167, all of which are hereby incorporated by reference in their entirety.

Figure 1:
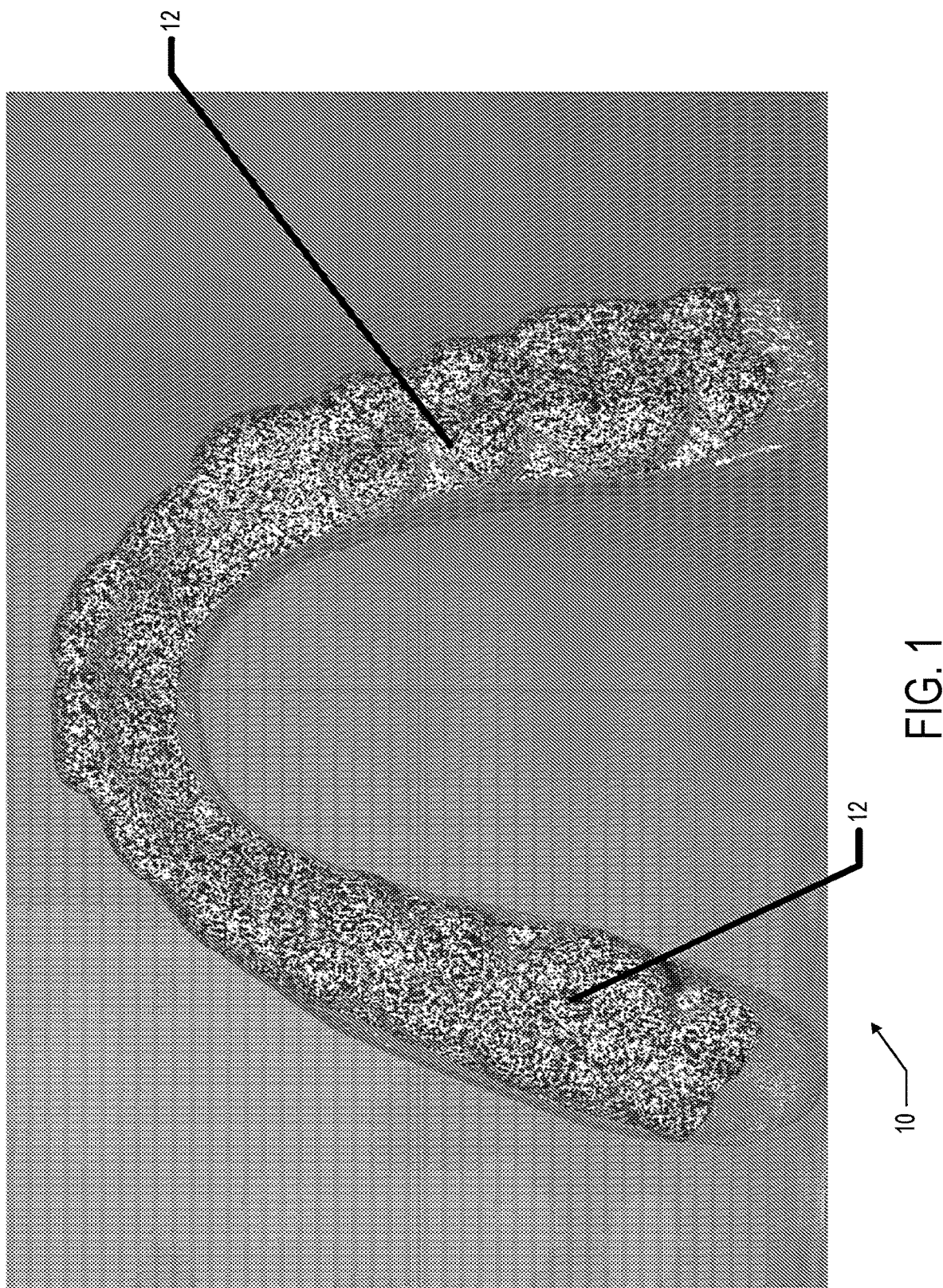
FIG. 1 shows an orthodontic aligner, in accordance with an aspect of the present disclosure.

Referring to FIG. 1, an orthodontic aligner 10 is illustrated. The orthodontic aligner comprises a plurality of speckles 12. It should be appreciated that only two speckles 12 are specifically called out in FIG. 1, but there are many more speckles on the illustrated aligner 10 that are not specifically called out.

The plurality of speckles 12 are adapted for digital image correlation measurements. A person having ordinary skill in the optical arts would recognize when a plurality of speckles can be utilized for digital image correlation measurements.

The plurality of speckles 12 can be oriented in the orthodontic aligner 10 in a random pattern or a pseudo-random pattern. Examples of suitable speckle patterns are also disclosed in U.S. Pat. Nos. 6,327,030 and 8,600,147, both of which are hereby incorporated by reference in their entirety.

The plurality of speckles 12 can have any optical characteristics that are suitable for digital image correlation. In some cases, the speckles 12 are adapted to be substantially invisible or nearly invisible to the naked eye of a person with normal color vision when illuminated by visible light and visible to the same naked eye when irradiated by light of a given wavelength. Two mechanisms for achieving this are fluorescence and phosphorescence. In some cases, the plurality of speckles 12 are fluorescent. In some cases, the plurality of speckles 12 are phosphorescent. In some cases, the plurality of speckles 12 are both fluorescent and phosphorescent. This feature allows the use of the clear orthodontic aligner 10 including speckles 12 in daily life while maintaining the transparency of the aligner yet still affording the capability to make the measurements described herein. However, this advantage does not preclude the possibility that the speckles 12 are visible to the naked eye when illuminated by visible light. In some cases, maintaining transparency of the aligner 10 may not be as relevant as other cases or a user might wish for a unique visual look associated with visible speckles arranged as described herein. For clarity, the speckles can be visible or transparent, can provide digital image signals via standard optical absorption, via fluorescence or phosphorescence, or by other optical mechanisms.

The orthodontic aligner 10 can be transparent or substantially transparent to the visible spectrum. The speckles 12 can be transparent or substantially transparent to the visible spectrum.

In some cases, the speckles 12 are limited to a region of specific interest and are not included in the entire orthodontic aligner 10. For example, the speckles 12 can be limited to the areas associate with given teeth of interest.

In some cases, a particular variety of orthodontic aligner 10 is utilized in combination with polymeric attachments that act like brackets and can be placed on teeth to aid tooth movement. In these cases, the aligners 10 can contain matching pockets that wrap around these polymeric attachments for force application. The systems and methods described herein can provide insight into how effective these attachments are and can lead to improved attachment placement and design.

Figure 2:
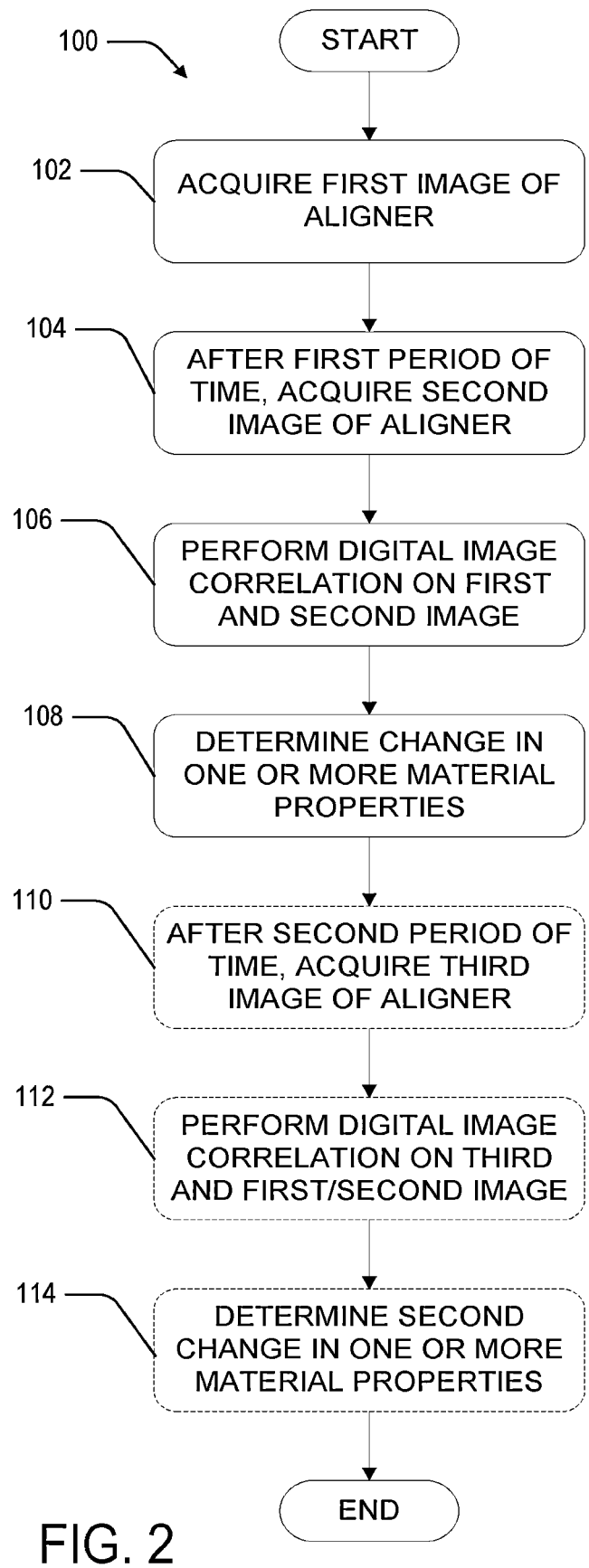
FIG. 2 is a flowchart illustrating a method, in accordance with an aspect of the present disclosure.

Referring to FIG. 2, a method 100 is illustrated. The method 100 involves making measurements intended to determine mechanical properties and responses/performances of an orthodontic aligner, such as those described elsewhere herein. At process block 102, the method 100 includes acquiring a first digital image of an orthodontic aligner comprising a plurality of speckles adapted for digital image correlation measurements. At process block 104, the method 100 includes, after a period of time following the acquiring of process block 102, acquiring a second digital image of the orthodontic aligner. At process block 106, the method 100 includes performing digital image correlation on the first digital image and the second digital image. At process block 108, the method 100 includes determining a change in one or more material properties and responses/performances in the orthodontic aligner based on the digital image correlation of process block 106.

The method 100 can also include further optional steps. At optional process block 110, the method 100 optionally includes, after a second period of time following the acquiring of process block 104, acquiring a third digital image of the orthodontic aligner. At optional process block 112, the method 100 optionally includes performing digital image correlation on the first digital image and the third digital image or the second digital image and the third digital image. At optional process block 114, the method 100 optionally includes determining a second change in one or more mechanical properties and responses/performances based on the digital image correlation of optional process block 112.

Figure 3:
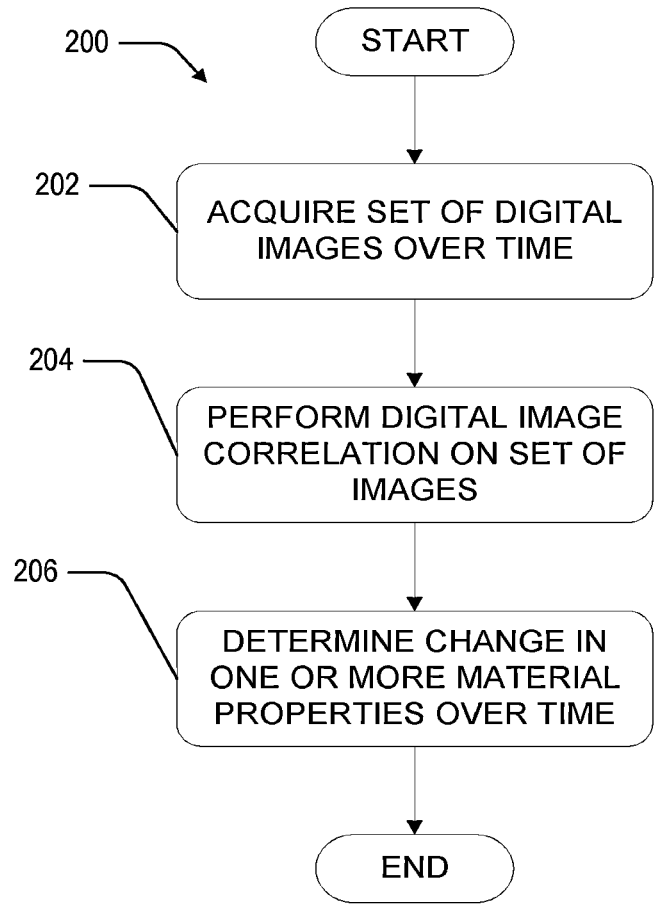
FIG. 3 is a flowchart illustrating a method, in accordance with an aspect of the present disclosure.
Figure 4:
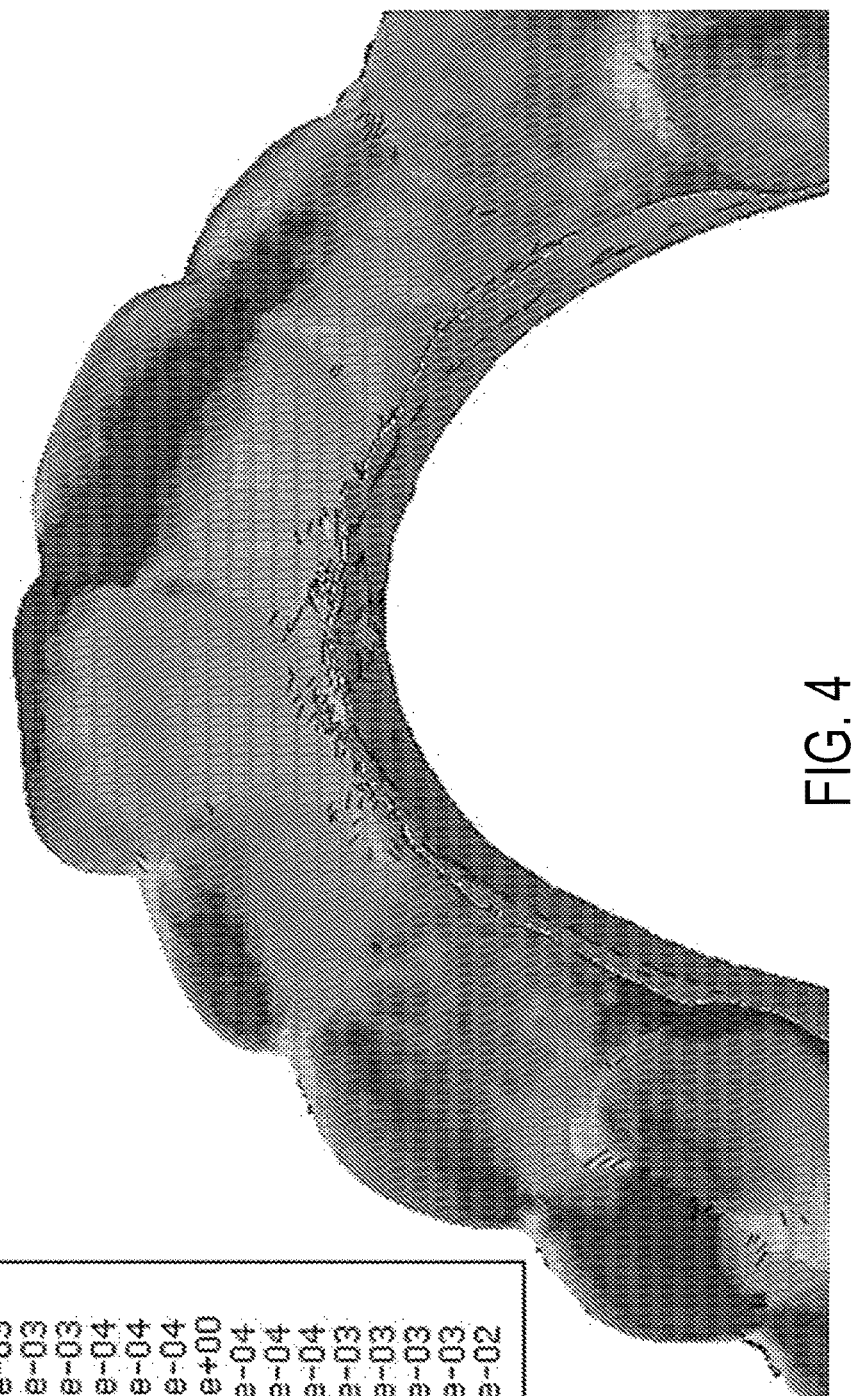
FIG. 4 is an image of strains estimated from a finite elemental analysis, as described in Example 2.
Figure 5:
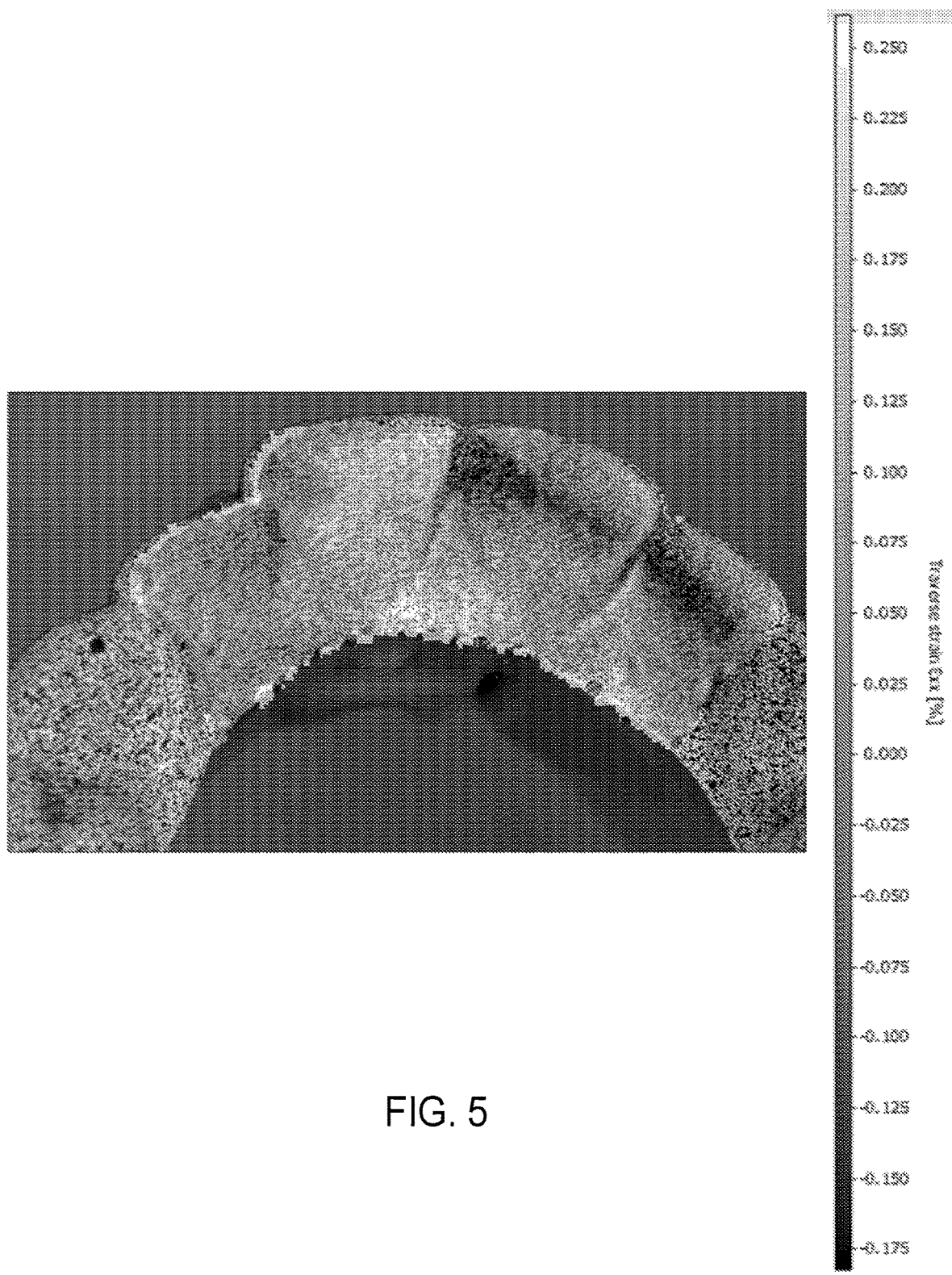
FIG. 5 is an image of strains estimated from digital image correlation, as described in Example 2.
Figure 6:
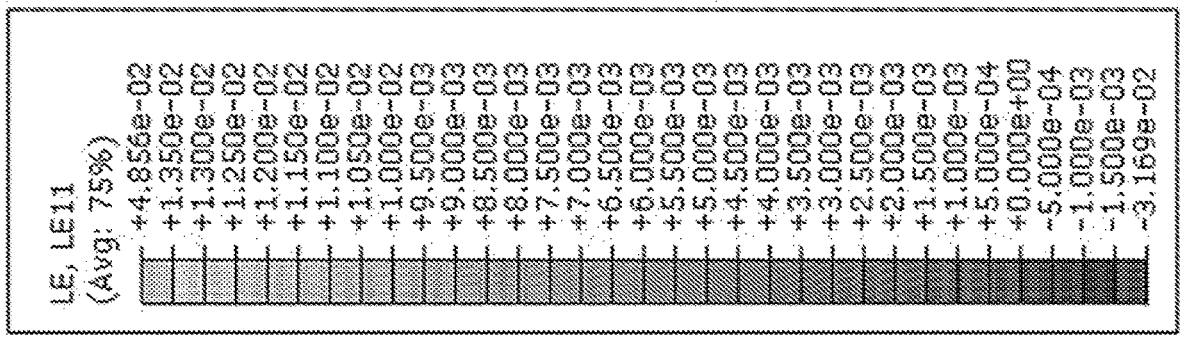
FIG. 6 is an image of strains estimated from a finite elemental analysis, as described in Example 2.
Figure 6:
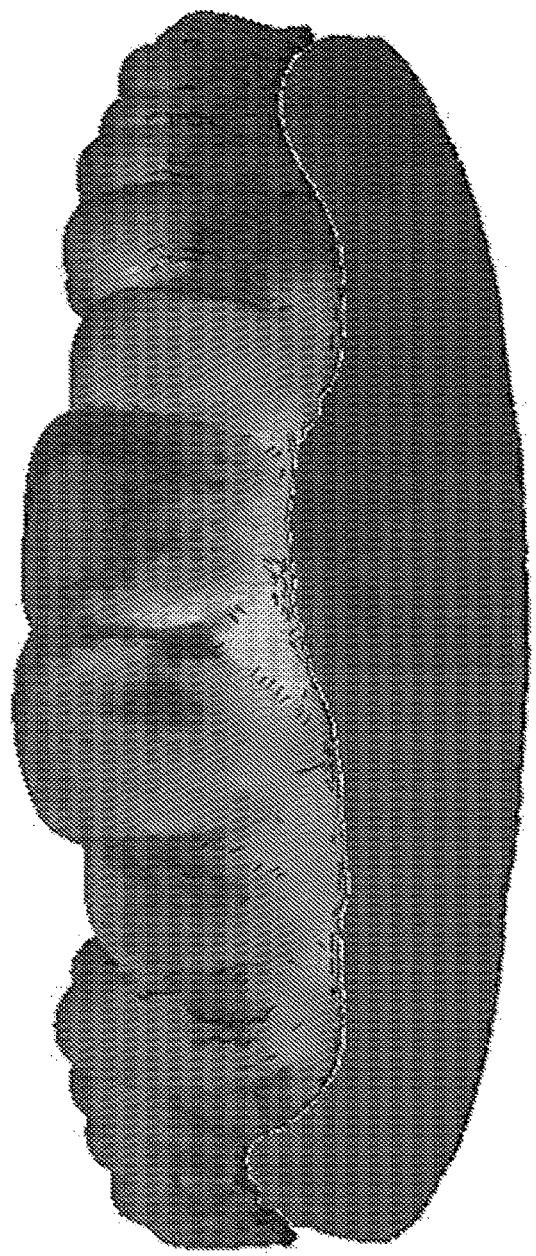
Figure 7:
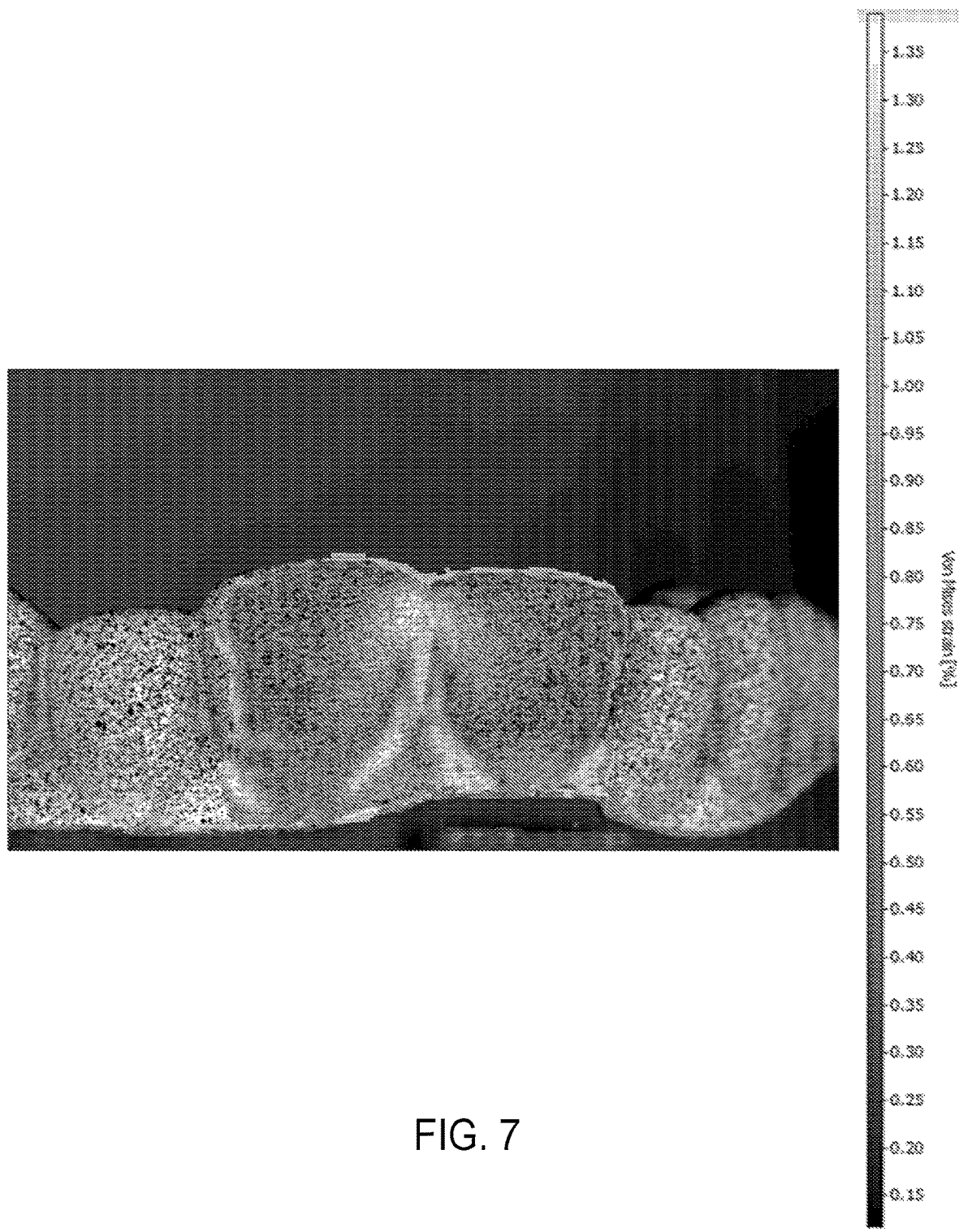
FIG. 7 is an image of strains estimated from digital image correlation, as described in Example 2.
Figure 8:
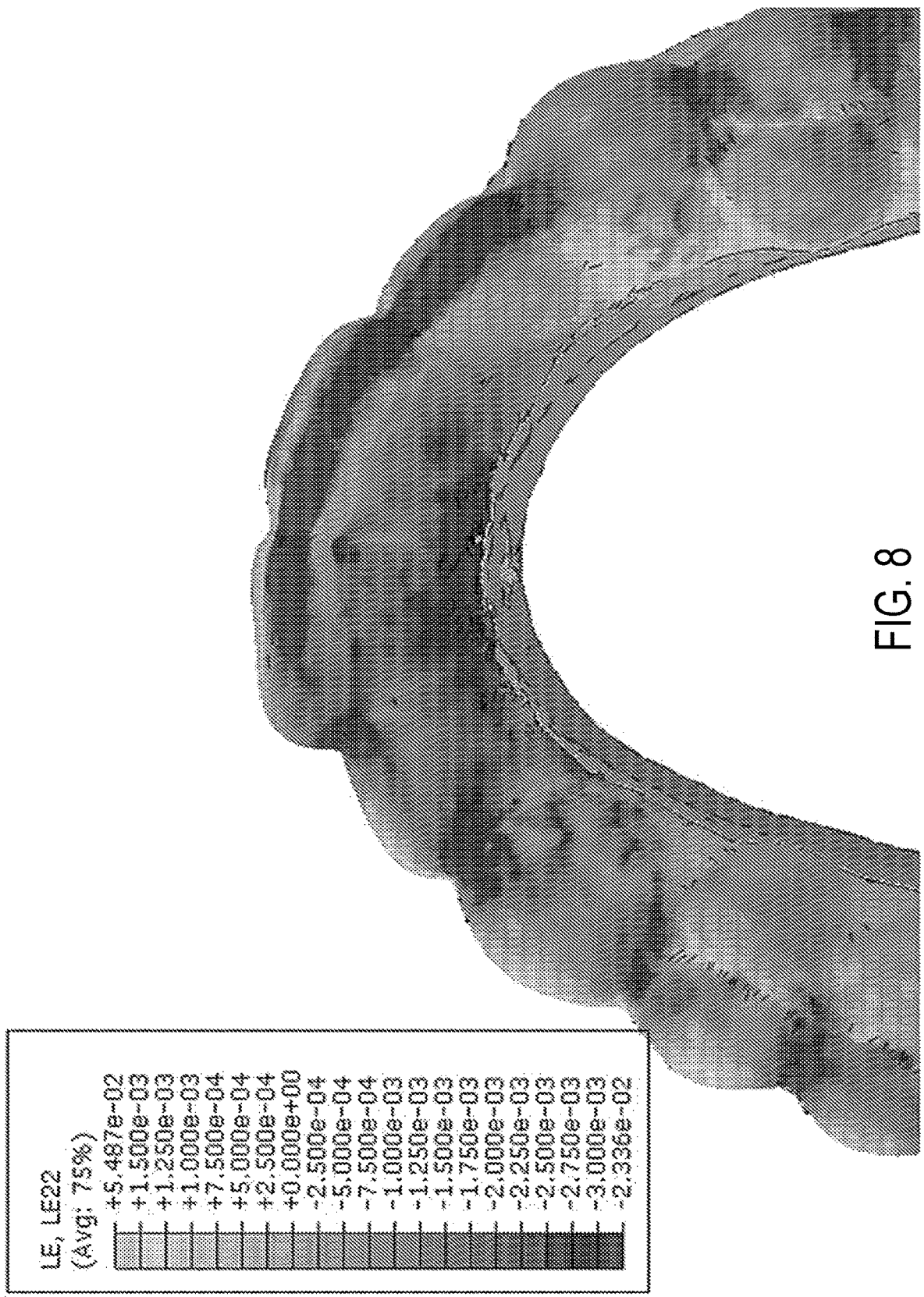
FIG. 8 is an image of strains estimated from a finite elemental analysis, as described in Example 2.
Figure 9:
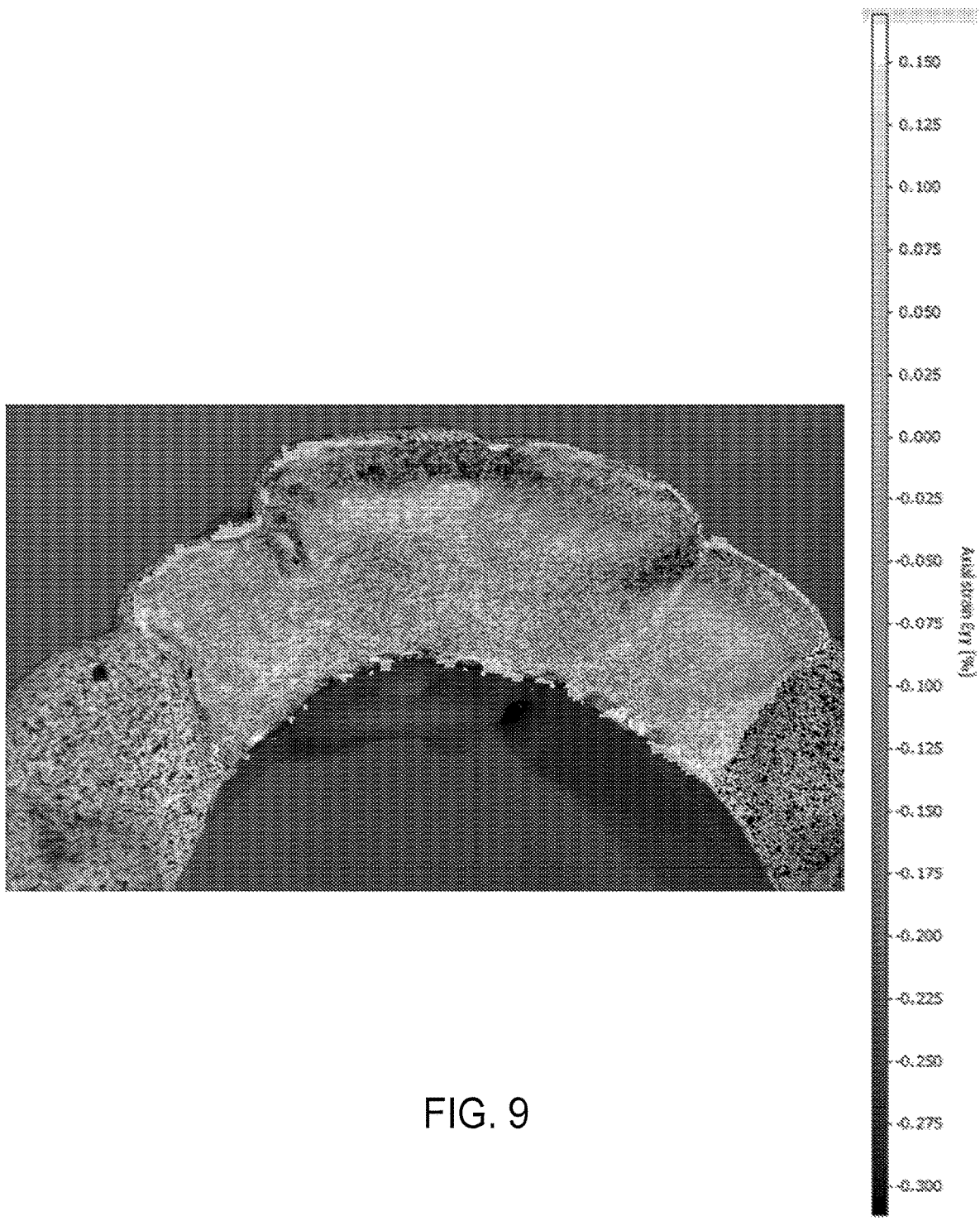
FIG. 9 is an image of strains estimated from digital image correlation, as described in Example 2.
Figure 10:
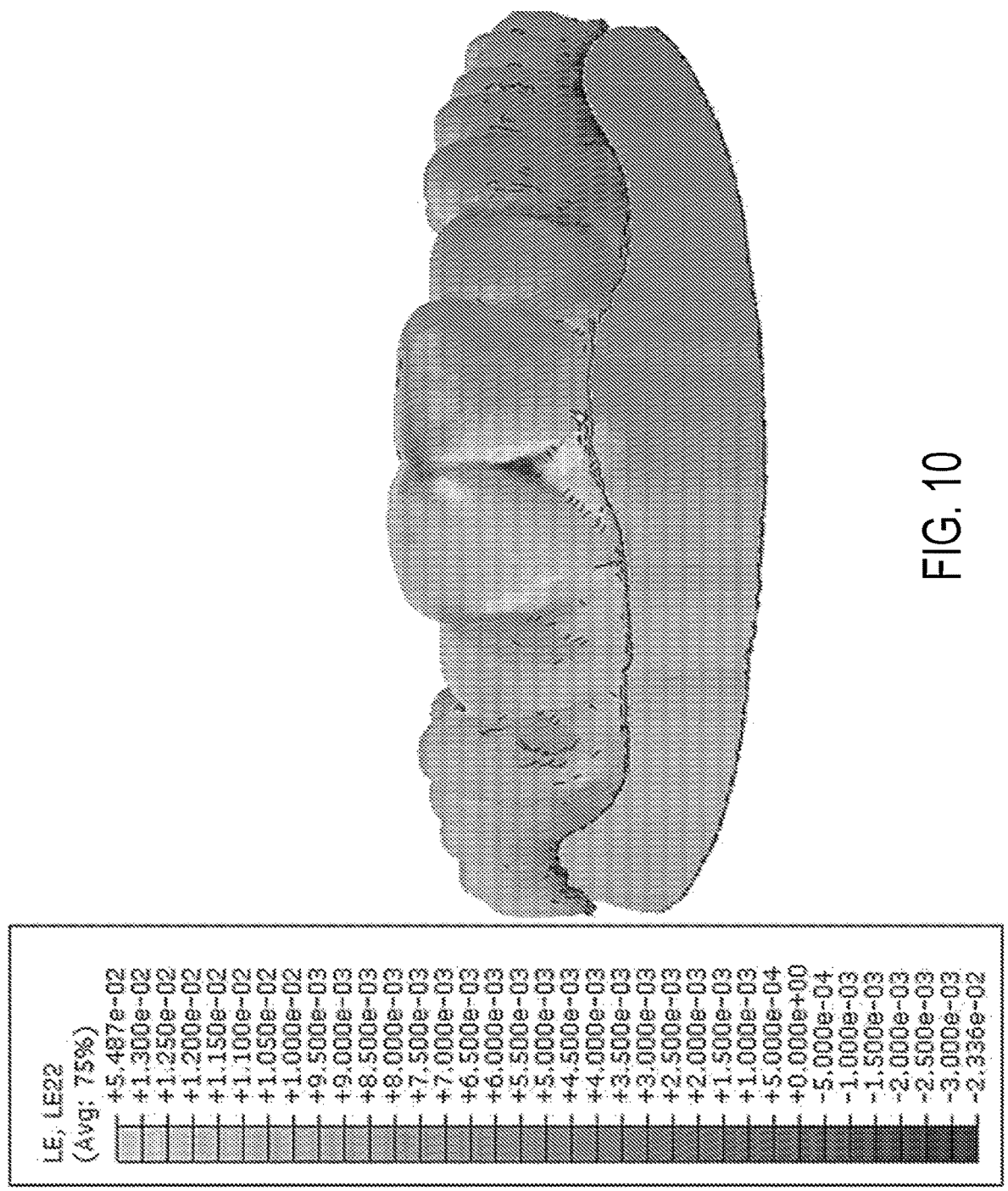
FIG. 10 is an image of strains estimated from a finite elemental analysis, as described in Example 2.
Figure 11:
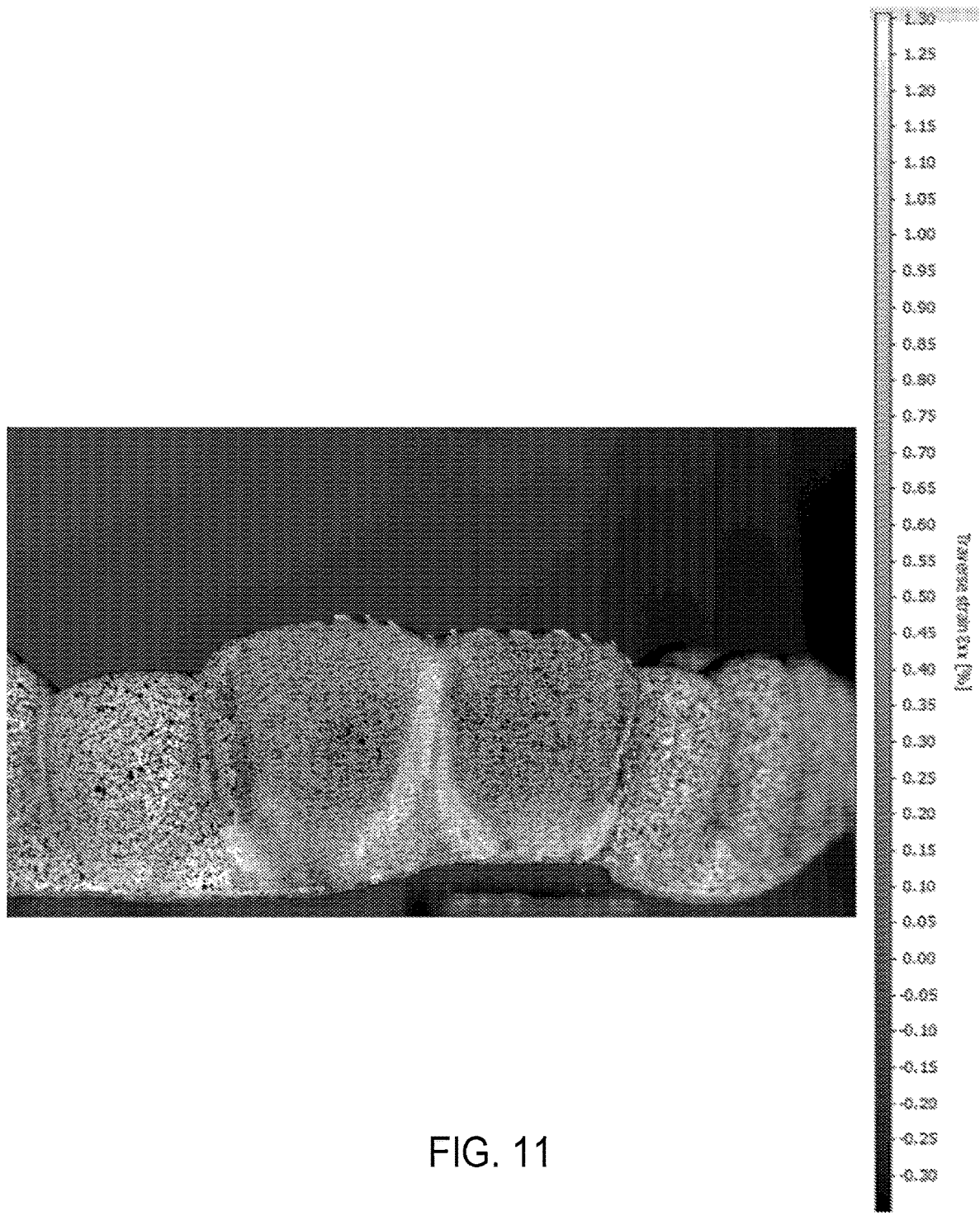
FIG. 11 is an image of strains estimated from digital image correlation, as described in Example 2.

Referring to FIG. 3, a method 200 is illustrated. The method 200 also involves making measurements intended to determine mechanical properties and responses/performances of an orthodontic aligner, such as those described elsewhere herein. At process block 202, the method 200 includes acquiring a set of digital images over a given period of time. At process block 204, the method 200 includes performing digital image correlation on the set of digital images. At process block 206, the method 200 includes determining a change over time in one or more mechanical properties and responses/performances in the orthodontic aligner based on the digital image correlation of process block 204.

It should be appreciated that method 100 can be included within method 200. For example, the first and second digital image of method 100 can be two of the set of digital images of method 200. It should also be appreciated that method 100 or method 200 can utilize the orthodontic aligner 10 disclosed herein and can make use of any of the features of the orthodontic aligner 10 disclosed herein. For the avoidance of doubt, features disclosed in relation to orthodontic aligner 10 are expressly contemplated as being included in method 100 and method 200.

Method 100 or method 200 can also include making an orthodontic recommendation based on the change (or second change or change over time) in the one or more mechanical properties and responses/performances. In some cases, this orthodontic recommendation can include suggesting that the orthodontic aligner be replaced with a new orthodontic aligner. In some cases, the orthodontic recommendation can include designing a replacement orthodontic aligner based on the first change, the second change, or the change over time in the one or more mechanical properties and responses/performances.

One specific algorithm for acquiring the mechanical properties and responses/performances is described herein, though others are contemplated and would be appreciated by those having ordinary skill in the art. The surface is divided into many small segments, each having a unique speckled pattern. By matching corresponding segments from different image sets through maximizing a correlation function based on the grey values, the displacement of each segment is determined. The strains are then determined from the full-field displacement distribution by either numerical differentiation or the use of a shape function (3D polynomial). In some cases, the displacements themselves can provide insight to orthodontists.

In many cases, the orthodontic aligner will be used by a subject during the time period between the acquisition of the first digital image and the second digital image. In these cases, the change in one or more mechanical properties and responses/performances can inform at least two different things: 1) treatment decisions made by orthodontists or other treatment professionals; and 2) improvements in design of the orthodontic aligner itself. The former advantage would be well understood and appreciated by those having ordinary skill in the orthodontic arts and the latter by those having ordinary skill in the medical device and/or biomedical engineering arts.

The one or more mechanical properties and responses/performances can include properties and responses/performances that are understood by those having skill in the relevant arts to be useful for monitoring the orthodontic effect, performance, design effectiveness, or the like. The one or more mechanical properties and responses/performances can include material strain distributions, material deformations, both elastic and permanent, or combinations thereof.

In some cases, the methods 100, 200 can further include estimating a mechanical property of a physiological structure of the patient based on the digital image correlation of step c) and a comparison digital image correlation measured external to the patient when the orthodontic aligner is placed on a rigid model having known mechanical properties. This estimating can be performed at two different points in time to thereby determine a change in the mechanical property of the physiological structure. The mechanical property can be estimated by predicting surface strains in a computation model and tuning the mechanical property within the computational model until the predicted surface strains match measured surface strains. The physiological structure of the patient can be a bone, a tendon, a muscle, a ligament, or a combination thereof. The physiological structure of the patient can be a periodontal ligament (PDL). An image of an aligner with a plurality of speckles will be taken while it is free-standing (IMF) and while it is being worn by a patient (IMP).

An image of the same aligner will be taken while it is being placed on a rigid model of known mechanical properties of the patient's teeth (IMM). Comparison of IMF against IMP and IMM using digital image correlation will determine the surface strains on the aligner while it being worn by the patient and placed on the rigid model, respectively. The surface strains on the aligner while it is being worn by the patient are expected to be lower due to compliance of the tooth-surrounding physiological structures such as bone and PDL. The difference in surface strains on the aligner between it being worn by the patient and it being placed on the rigid model can therefore inform the mechanical properties of the physiological structures. A finite element model of the aligner and the rigid tooth model will be built first and validated by using the surface strains given by IMM and IMF. Another finite element model of the aligner, the patient's teeth and the surrounding physiological structures will then be built and the mechanical properties of the physiological structures adjusted until the predicted surface strains on the aligner agree with those given by IMP and IMF. This procedure can be repeated at different stages of treatment to determine how the mechanical properties of the tooth-surrounding physiological structures of a patient change with time/treatment.

EXAMPLES

Example 1

An example arch was formed based on the top teeth of a patient of interest and a corresponding conventional clear thermoplastic tooth aligner was generated according to conventional orthodontic practices. For the purposes of acquiring images for the purposes of digital image correlation, a plurality of visible speckles were incorporated by spraying paint onto the tooth aligner in a pattern suitable for digital image correlation. It should be appreciated that transparent, fluorescent speckles would be expected to function in a similar fashion and visible speckles were selected for ease of experimentation.

One experiment was conducted using digital image correlation (StrainMaster, LaVision Inc., Ypsilanti, MI, USA) and another experiment was conducted using Micro-CT (XT H 225, Nikon Metrology, Inc., Brighton, MI, USA) scanning and finite-element analysis (Abaqus, SIMULIA, Dassault Systems, Waltham, MA, USA). In each experiment, one image of the tooth aligner was acquired before engaging the arch. In the second experiment, the arch itself was also scanned using Micro-CT scanning. In both experiments, the complete assembly of the tooth aligner applied to the arch was also imaged.

For the digital image correlation experiment, one digital image correlation image was acquired of the tooth aligner before engaging anything and a second image was acquired following engagement with the arch to form an assembly. Digital image correlation (StrainMaster, LaVision Inc., Ypsilanti, MI, USA) was performed on the two images, which were calibrated beforehand using standard calibration plates to establish the correct dimensions of the aligner. The result was a displacement and strain map with the correct units.

For the numerical simulation, Micro-CT (XT H 225, Nikon Metrology, Inc., Brighton, MI, USA) scans were acquired for the tooth aligner and the arch, separately and together as an assembly. Models of each were constructed using 3-matic (Materialise, Plymouth, MI, USA) for finite element analysis (Abaqus, SIMULIA, Dassault Systemes, Waltham, MA, USA). 3D 10-noded tetrahedron elements were used for meshing. Suitable material properties such as elastic modulus and Poisson's ratio were assigned to each object. The base of the arch was fixed and the mechanical interaction between the arch and aligner was simulated using interference fit. Stresses and strains on the aligner as well as forces and moments on each tooth were evaluated.

The displacement and strain distributions from the digital image correlation experiment together with the interfacial gaps from micro-CT validated the finite element model of a clear teeth aligner for orthodontics. The forces and moments induced on the teeth will be used to study the effectiveness of the aligner design in realizing the desired loading configuration. They will also be used to study long-term tooth movement caused by the wearing of such devices. The stresses and strains experienced by the aligner itself will be used to improve the design and performance of the aligner.

Example 2

An orthodontic aligner was applied to an arch with a tilted incisor (roughly 2.4 degrees). Clinically, it is expected that the orthodontic aligner should be able to bring the tilted tooth to its desired position and orientation over time. Digital image correlation was performed as described herein and in Example 1. A finite element analysis model was built to simulate the same set of aligner and teeth using the process described in Example 1.

FIGS. 4-11 compare strains from the finite element analysis model (FIGS. 4, 6, 8, and 10) with those from the digital image correlation measurements (FIGS. 5, 7, 9, and 11). Comparison of the digital image correlation and the finite elemental analysis showed good agreement regarding the strains, confirming that digital image correlation is viable for measuring strains on orthodontic aligners and validating the computational model for use to calculate the forces exerted on each tooth.

The present disclosure has described one or more preferred embodiments, and it should be appreciated that many equivalents, alternatives, variations, and modifications, aside from those expressly stated, are possible and within the scope of the invention.

We claim:

1. A method including steps comprising:
   a) acquiring a first digital image of an orthodontic aligner comprising a plurality of speckles adapted for digital image correlation measurements;
   b) after a first period of time following the acquiring of step a), acquiring a second digital image of the orthodontic aligner;
   c) performing digital image correlation on the first digital image and the second digital image;
   d) determining a first change in one or more mechanical properties, mechanical responses, or mechanical performances in the orthodontic aligner based on the digital image correlation of step c);
   e) after a second period of time following the acquiring of step b), acquiring a third digital image of the orthodontic aligner;
   f) performing digital image correlation on the first digital image and the third digital image or on the second digital image and the third digital image; and
   g) determining a second change in one or more mechanical properties, mechanical responses, or mechanical performances in the orthodontic aligner based on the digital image correlation of step f).

2. The method of claim 1, wherein the orthodontic aligner is imaged while being used by a subject during at least one of the first period of time or the second period of time.

3. The method of claim 1, wherein the one or more mechanical properties, mechanical responses, or mechanical performances includes material strain distributions.

4. The method of claim 1, wherein the one or more mechanical properties, mechanical responses, or mechanical performances includes material deformations.

5. The method of claim 1, further comprising h) after a third period of time following the acquiring of step e), acquiring a fourth digital image of the orthodontic aligner.

6. The method of claim 5, the method further comprising:
   i) performing digital image correlation on the first digital image and the fourth digital image, on the second digital image and the fourth digital image, or on the third digital image and the fourth digital image; and
   i) determining a third change in one or more mechanical properties, mechanical responses, or mechanical performances in the orthodontic aligner based on the digital image correlation of step k).

7. The method of claim 1, further comprising:
   h) acquiring a set of digital images over a given period of time;
   i) performing digital image correlation on the set of digital images; and
   j) determining a change over time in one or more mechanical properties, mechanical responses, or mechanical performances in the orthodontic aligner based on the digital image correlation of step i).

8. The method of claim 1, comprising suggesting that the orthodontic aligner be replaced with a new orthodontic aligner based on the first change in one or more mechanical properties, mechanical responses, or mechanical performances or the second change in one or more mechanical properties, mechanical responses, or mechanical performances.

9. The method of claim 1, further comprising designing a replacement orthodontic aligner based on the first change in one or more mechanical properties, mechanical responses, or mechanical performances or the second change in one or more mechanical properties, mechanical responses, or mechanical performances.

10. The method of claim 1, further comprising estimating a mechanical property of a physiological structure of the patient based on the digital image correlation of step c) and a comparison digital image correlation measured external to the patient when the orthodontic aligner is placed on a rigid model having known mechanical properties.

11. The method of claim 10, further comprising estimating the mechanical property at two different times, thereby determining a change in the mechanical property.

12. The method of claim 10, wherein the mechanical property is estimated by predicting surface strains in a computational model and tuning the mechanical property within the computational model until the predicted surface strains match measured surface strains.

13. The method of claim 10, wherein the physiological structure of the patient is a periodontal ligament.

14. An orthodontic apparatus comprising:
   an orthodontic aligner; and
   a plurality of speckles coupled to the orthodontic aligner and adapted for digital image correlation measurements, wherein the plurality of speckles are invisible or nearly invisible when illuminated by visible light.

15. The orthodontic apparatus of claim 14, wherein the plurality of speckles are oriented in a random or pseudo-random pattern.

16. The orthodontic apparatus of claim 14, wherein the orthodontic aligner is transparent to a visible light spectrum.

17. The orthodontic apparatus of claim 14, wherein the plurality of speckles are fluorescent, phosphorescent, or both.

18. The orthodontic apparatus of claim 14, wherein the plurality of speckles become visible in the visible spectrum when irradiated by light of a predetermined wavelength.

19. The method of claim 1, wherein the plurality of speckles are at least one of:
   oriented in a random or pseudo-random pattern;
   fluorescent, phosphorescent, or fluorescent and phosphorescent; or
   visible in a visible light spectrum when irradiated by light of a predetermined wavelength.

20. The method of claim 1, wherein the orthodontic aligner is transparent to a visible light spectrum.

* * * * *